(12) United States Patent
    Sunkara et al.

(10) Patent No.: US 11,103,848 B2
(45) Date of Patent: Aug. 31, 2021

(54) FLAME BASED FLUIDIZED BED REACTOR FOR NANOMATERIALS PRODUCTION

(71) Applicant: Advanced Energy Materials, LLC, Louisville, KY (US)

(72) Inventors: Mahendra Sunkara, Louisville, KY (US); Tu Quang Nguyen, Louisville, KY (US); Lukus Guhy, Lousville, KY (US); William Paxton, Lousville, KY (US)

(73) Assignee: Advanced Energy Materials, LLC, Louisville, KY (US)

( * ) Notice: Subject to any disclaimer, the term of this patent is extended or adjusted under 35 U.S.C. 154(b) by 275 days.

(21) Appl. No.: 16/325,375

(22) PCT Filed: Aug. 15, 2017

(86) PCT No.: PCT/US2017/047002
§ 371 (c)(1),
(2) Date: Feb. 13, 2019

(87) PCT Pub. No.: WO2018/035152
PCT Pub. Date: Feb. 22, 2018

(65) Prior Publication Data
US 2019/0193044 A1    Jun. 27, 2019

Related U.S. Application Data

(60) Provisional application No. 62/375,414, filed on Aug. 15, 2016.

(51) Int. Cl.
*B01J 19/24*    (2006.01)
*B01J 19/08*    (2006.01)
(Continued)

(52) U.S. Cl.
CPC ............. *B01J 19/08* (2013.01); *B01J 12/002* (2013.01); *B01J 19/24* (2013.01); *B01J 19/26* (2013.01); *B01J 37/349* (2013.01); *C01F 7/422* (2013.01); *C01F 7/424* (2013.01); *C01G 9/03* (2013.01); *C01G 19/02* (2013.01); *C01G 49/02* (2013.01); *C04B 35/62231* (2013.01); *C04B 35/62259* (2013.01); *B01J 2219/0869* (2013.01); *B01J 2219/0879* (2013.01);
(Continued)

(58) Field of Classification Search
None
See application file for complete search history.

(56) References Cited

U.S. PATENT DOCUMENTS 4,314,830 A * 2/1982 Skiven ................. B01D 50/002
                                              266/155
5,013,355 A * 5/1991 Elvander ................... C22B 5/14
                                              75/707
(Continued)

*Primary Examiner* — George Wyszomierski
(74) *Attorney, Agent, or Firm* — Law Office of J. L. Simunic; Joan Simunic

(57) ABSTRACT

The present development is a reactor system for the production of nanostructures. The reactor system comprises a conical reactor body designed to maintain an upwardly directed vertical plasma flame and hydrocarbon flame. The reactor system further includes a metal powder feed that feeds into the plasma flame, a cyclone and a dust removal unit. The system is designed to produce up to 100 grams of metal oxide nanomaterials per minute.

14 Claims, 6 Drawing Sheets

(51) Int. Cl.
 *C01G 19/02* (2006.01)
 *C01G 9/03* (2006.01)
 *C04B 35/622* (2006.01)
 *B01J 12/00* (2006.01)
 *B01J 19/26* (2006.01)
 *C01F 7/42* (2006.01)
 *C01G 49/02* (2006.01)
 *B01J 37/34* (2006.01)
 *B82Y 30/00* (2011.01)

(52) U.S. Cl.
 CPC *B01J 2219/0898* (2013.01); *B01J 2219/1946* (2013.01); *B82Y 30/00* (2013.01); *C01P 2004/16* (2013.01); *C01P 2004/61* (2013.01); *C01P 2004/62* (2013.01); *C01P 2004/64* (2013.01); *C04B 2235/3201* (2013.01); *C04B 2235/3232* (2013.01); *C04B 2235/40* (2013.01); *C04B 2235/5436* (2013.01)

(56) References Cited

U.S. PATENT DOCUMENTS

| | | | |
|---|---|---|---|
| 5,200,595 A | 4/1993 | Boulos et al. | |
| 7,445,671 B2 | 11/2008 | Sunkara et al. | |
| 7,446,335 B2 | 11/2008 | Kortshagen et al. | |
| 7,591,897 B2 | 9/2009 | Sunkara et al. | |
| 7,597,941 B2 | 10/2009 | Sunkara et al. | |
| 7,713,352 B2 | 5/2010 | Sunkara et al. | |
| 7,846,414 B2 | 12/2010 | Harbec et al. | |
| 8,016,944 B2 | 9/2011 | Kortshagen et al. | |
| 8,834,827 B2 | 9/2014 | Simard et al. | |
| 8,920,970 B2 | 12/2014 | Sunkara et al. | |
| 9,409,141 B2 | 8/2016 | Sunkara et al. | |
| 2003/0115986 A1 | 6/2003 | Pozarnsky et al. | |
| 2004/0065170 A1 | 4/2004 | Wu et al. | |
| 2007/0118938 A1 | 5/2007 | Sunkara et al. | |
| 2007/0209576 A1 | 9/2007 | Sunkara et al. | |
| 2007/0281216 A1 | 12/2007 | Petrat et al. | |
| 2010/0199557 A1* | 8/2010 | Dighe | C10J 3/18 48/65 |
| 2012/0027955 A1 | 2/2012 | Sunkara et al. | |
| 2012/0028124 A1 | 2/2012 | Sunkara et al. | |
| 2013/0017145 A1 | 1/2013 | Sunkara et al. | |
| 2013/0118304 A1* | 5/2013 | Lee | C22B 4/005 75/10.19 |
| 2014/0227548 A1 | 8/2014 | Myrick | |
| 2016/0045841 A1 | 2/2016 | Kaplan et al. | |

\* cited by examiner

FLAME BASED FLUIDIZED BED REACTOR FOR NANOMATERIALS PRODUCTION

CROSS-REFERENCE TO PRIOR APPLICATIONS

The present application claims priority to U.S. Patent Application 62/375,414 filed 2016 Aug. 15, which is incorporated by reference in its entirety.

GOVERNMENT INTEREST

This invention was made with government support under DE-SC0015808 awarded by the U.S. Department of Energy and under IIP-1430633 awarded by the National Science Foundation. The government has certain rights in the invention.

FIELD OF THE INVENTION

The invention relates to the production of nanomaterials and apparatus to produce the nanomaterials.

BACKGROUND OF THE INVENTION

Following the discovery of carbon nanotubes in 1991, one-dimensional (1-D) nanomaterials have attracted great research interest due to their unique properties that allow them to be ideal building blocks in important applications such as catalyst supports, absorbent, batteries, solar cells, capacitors, sensors, and polymer composite. In particular, metal oxide nanowires have emerged as one of the most important classes of 1-D nanomaterials because they tend to be single crystalline layers with well-defined surfaces, thus possessing excellent surface and bulk charge carrier transport properties.

Traditionally, metal oxide nanowires have been synthesized using liquid phase methods, such as hydrothermal synthesis, sol-gel processes, electrochemical reactions and surfactant enhanced methods. These methods, however, are not commercially viable to produce nanowires in large quantities and are tedious and prone to contamination during the multi-step processing. Gas phase techniques, such as chemical vapor deposition, usually requires the use of expensive, rare metal catalyst clusters on a substrate with each catalyst cluster leading to a single nanowire, thereby limiting scalability. In short, the prior art techniques limit production to only few milligrams of nanowires in the form of thin films per production run.

Flame based synthesis techniques, such as aerosol flame syntheses, are commonly used to produce nanomaterials at the commercial scale. However, flame-based synthesis techniques tend to produce a variety of nanoparticles or nanostructures, depending on the starting materials, but formation of particular nanostructure, such as a rod-like structure, is difficult to control. Moreover, flame based synthesis requires specialized and often expensive precursors, such as diethyl zinc.

More recently, in U.S. Published Application 2012/0027955A1, Sunkara et al. have proposed the synthesis of zinc oxide nanowires using a high plasma power wherein the plasma flame is delivered substantially longitudinally downward into a dielectric tube and metal powder is delivered into the plasma from a position above the plasma flame so that the powder can gravity-feed into the plasma flame. While metal oxide nanostructures are produced without the need for substrates or other supports using the method of the '955 publication, the method is not capable of producing nanowires in an efficient, consistent and cost-effective manner because it is necessary to use sheath gases and a strong downward airflow to maintain the plasma flame in a downward orientation. This causes fast movement of metal particles in the plasma flame resulting in relatively short residence times and a relatively large portion of unreacted metal powder. Further, with this method, the rate of nanowire production is self-limiting: additional powder feeders may be used but this requires greater gas flow which imparts drag on the system which reduces the residence time which results in larger portions of unreacted particles.

The production of small quantities of nanowire powders is acceptable for studying the properties, structure, process chemistry schemes, and individual experimental nanowire-based devices. However, any potential commercial application will require materials on the order of several hundreds of grams for even simple testing and device prototyping. Therefore, there is a need for a scalable technology for the bulk production of nanowires having predictable structures which are produced from different materials.

SUMMARY OF THE PRESENT INVENTION

The present development is a reactor system for the production of nanostructures. The reactor system comprises a fluidized bed reactor body designed to maintain an essentially vertical upward plasma flame or a hydrocarbon flame, a means to feed metal powder into the plasma flame, a cyclone and a dust removal unit. As described herein, the system can produce over one hundred grams of metal oxide nanomaterials per minute.

DETAILED DESCRIPTION OF THE PRESENT DEVELOPMENT

The following description is intended to provide the reader with a better understanding of the invention. The description is not intended to be limiting with respect to any element not otherwise limited within the claims. For example, the present invention will be described in the context of use with zinc metal powders, but the apparatus described and claimed herein is not limited to use with zinc metal powders.

The present development is a reactor system for the production of nanomaterials and a method of using the reactor system for the production of nanomaterials. As used herein, "nanomaterials" includes nanowires, nanorods, nanoparticles having a maximum diameter in at least one dimension of about 1,000 nanometers. The nanomaterial examples presented herein will comprise zinc oxide, tin oxide, iron oxide, titanium oxide, or aluminum oxide, but nanowires or nanorods or nanoparticles comprising other metals or metal oxides are known in the art and it is anticipated that the apparatus and methods disclosed herein would apply to those other metals and metal oxides. The metal powder, or precursor particles, is selected from metal particles of 50 nm to 50 microns in diameter for nanowires, nanorods, nanoparticles or from metal salt particles for nanoparticles.

Figure 1:
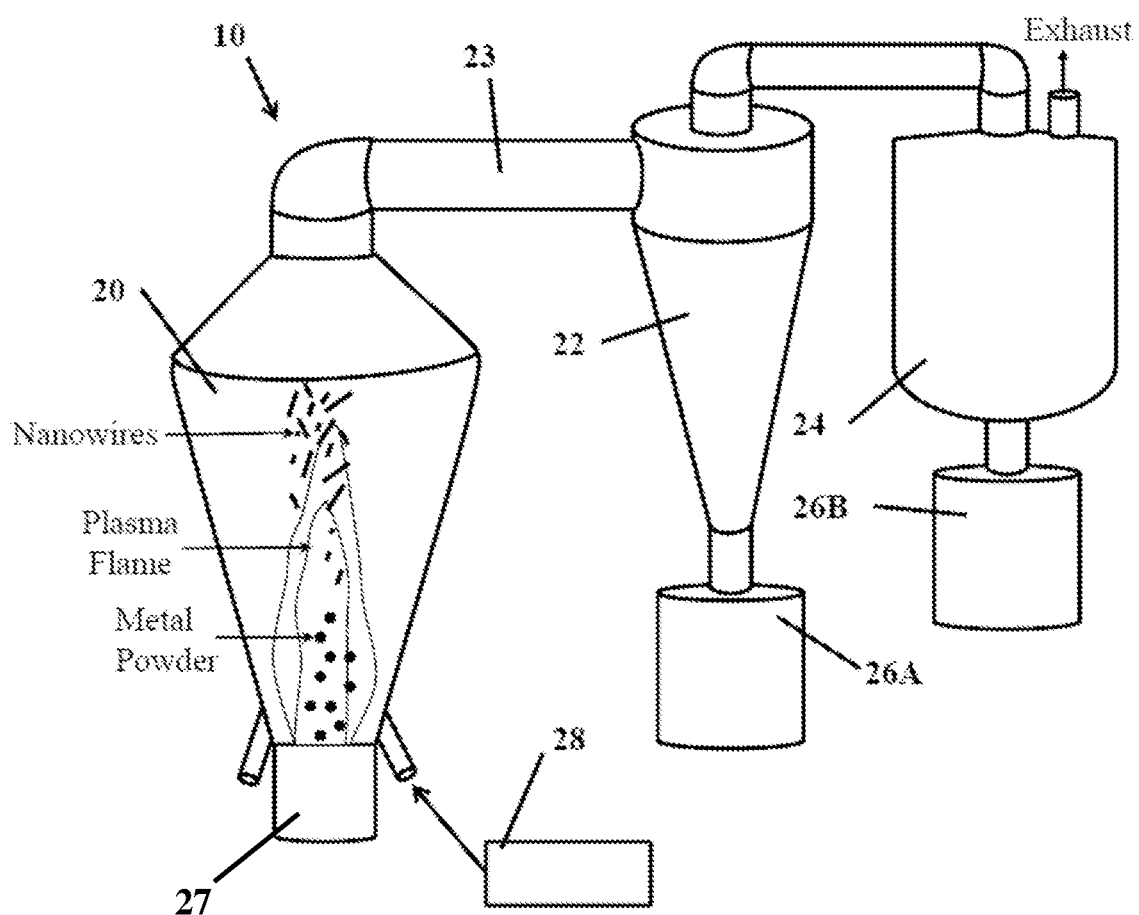
FIG. 1 is a schematic representation of a reactor system made in accordance with the present invention.

As shown in FIG. 1, the reactor system 10 of the present invention comprises a fluidized bed reactor body 20, a cyclone 22, a dust removal unit 24, one or more material collection containers 26A, 26B, a flame source 27, and at least one powder feeder 28. The reactor body 20 has a covered cone shape with the narrow end of the cone facing downward and with the flame source 27 located at the narrow end of the cone. The wide end of the cone is located near the top of the reactor body 20 and is in communication with the cyclone 22 via means to allow for solid material transfer, such as through pipework 23. As used herein, "solid" refers to solid or gelled materials. The cyclone 22 has a material rework container 26A reversibly affixed to the base of the cyclone 22. The cyclone 22 is also in communication with the dust removal unit 24, such as through pipework 23A. A product collection container 26B is reversibly affixed to the base of the dust removal unit 24. Collected materials from the cyclone 22 and the dust collector 24 are collected by gravity into the material rework container 26A and the product collection container 26B, respectively. The flame source 27 may be a plasma applicator or a plasma flame source or a hydrocarbon burner or a hydrocarbon flame source or a combination thereof, and the flame source 27 may comprise a single unit or multiple units.

Figure 2:
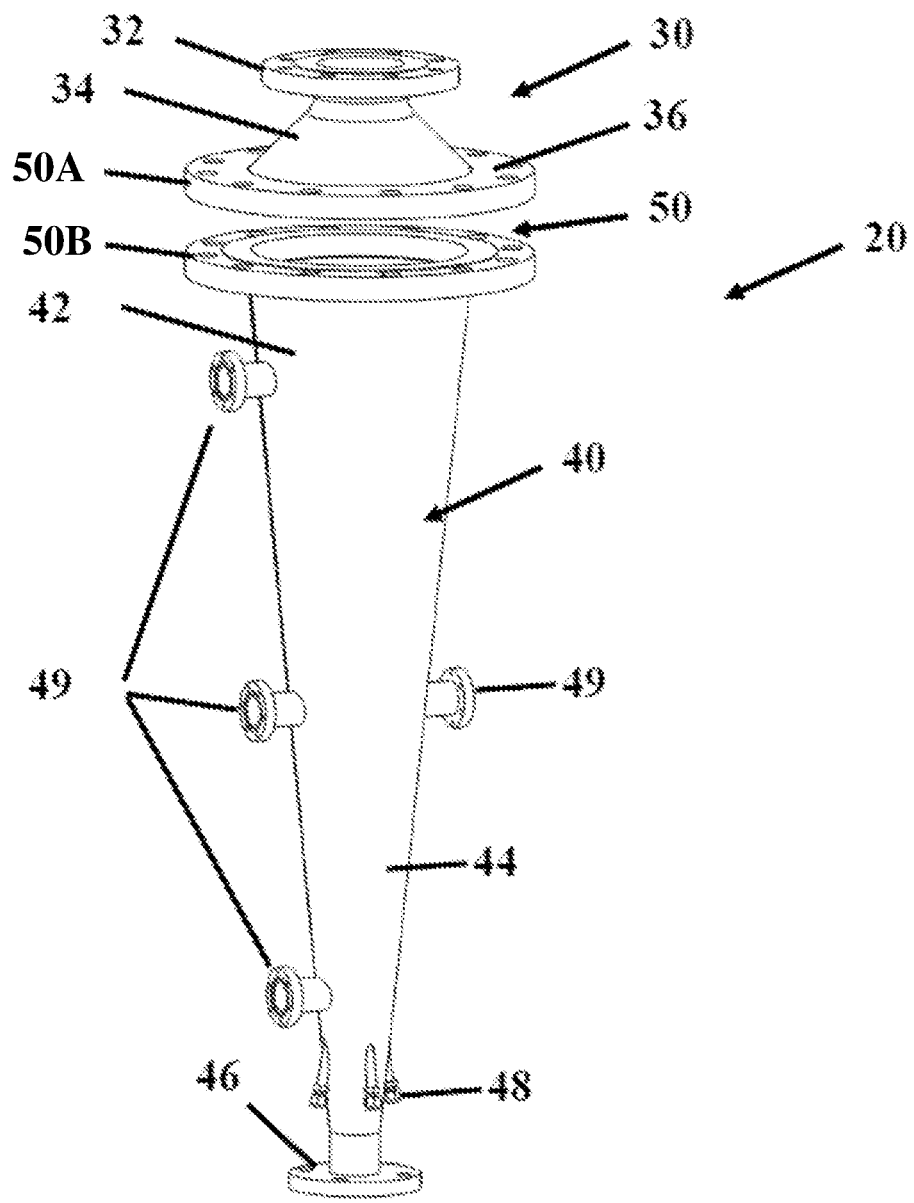
FIG. 2 is a schematic representation of the first generation reactor body of the reactor system shown in FIG. 1.
Figure 5:
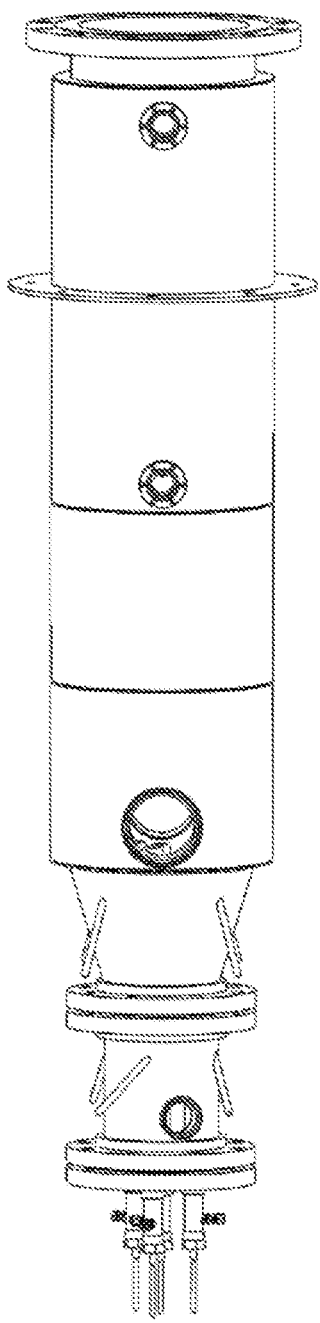
FIG. 5 is a schematic representation of the second generation reactor body of the reactor system shown in FIG. 4.

As shown in FIG. 2, the reactor body 20 has a covered cone configuration that includes a top unit 30 and a bottom unit 40. The top unit 30, which provides the cover to the cone, comprises a head 32, a neck 34 and a base 36. The bottom unit gives the reactor body 20 its cone shape and comprises a head 42, a body 44 and a base 46. The base of the bottom unit 46 is the most narrow section of the cone. In an alternative embodiment, the reactor body may have a cylindrical configuration, such as shown in FIG. 5.

The top unit or cap 30 is connected to the bottom unit or reactor cone 40 at an interface 50 formed by abutting the base of the top unit 36 against the head of the bottom unit 42. The top unit 30 is secured to the bottom unit 40 at the interface 50 via means known in the art, such as through use of bolted flanges 50A, 50B. The top unit 30 is also connected to and in communication with the cyclone 22 such that solid material may pass from the reactor body 20 into the cyclone 22. In a preferred embodiment, the head of the top unit 32 is connected to the cyclone 22 by pipework 23, although any means that will allow for the passage of solid material may be used.

The bottom unit 40 is designed to allow a vertical upward-directed flame to project from the base 46 toward the head 42 of the bottom unit. The bottom unit 40 further includes at least one inlet port 48 positioned near the base 46. In a preferred embodiment, if the bottom unit 40 is divided transversely into quarters, the inlet port 48 is located in the quarter that includes the base 46. Optionally, the bottom unit 40 may further comprise one or more view ports 49 positioned anywhere along the body 44 of the bottom unit. The view ports 49 may allow for access to the interior of the bottom unit 40, such as to allow for injecting materials into the reactor 20 or to remove samples from the reactor 20, or the view ports 49 may be fixed, such as to allow for viewing into the reactor 20 without allowing for sample removal, or there may be a combination thereof.

Referring again to FIG. 1, the flame source 27 is secured to the base of the bottom unit 46 such that a plasma flame or a hydrocarbon flame or a combination thereof can be directed vertically upward into the reactor body 20. This orientation allows the flame to burn upward and away from the flame source 27 without the need for high pressure or rapid flow sheath gases or forced air currents or a combination thereof. Optionally, sheath gases or forced air or a combination thereof may be fed to the flame, but with the upward directed flame the sheath gases or forced air does not require feed rates that could affect residence times for the metal powder in the flame.

Figure 3:
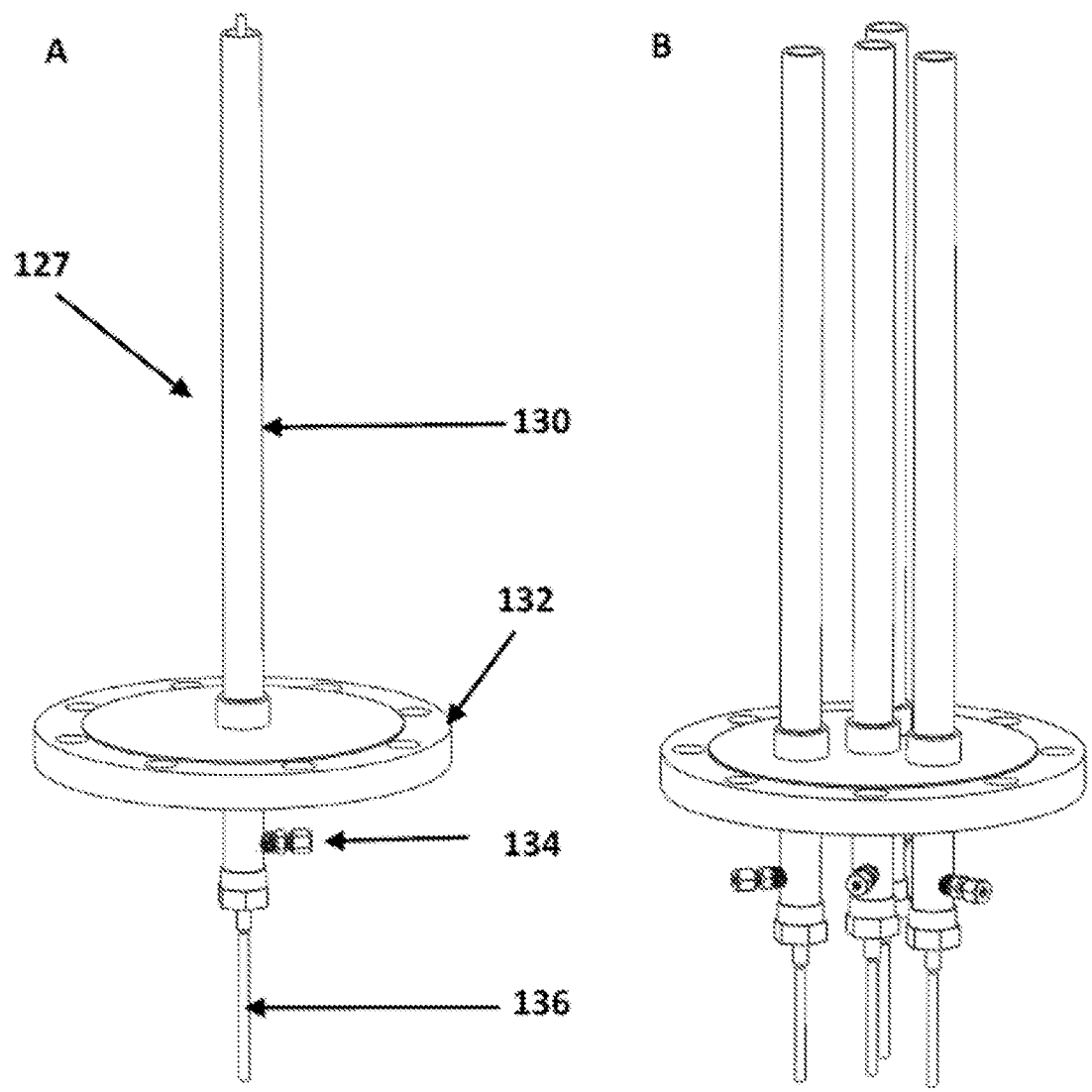
FIG. 3 is a schematic representation of a hydrocarbon burner for combustion in a sealed reactor chamber.

The flame source 27 may be a plasma applicator or plasma torch or hydrocarbon burner or a combination thereof. The plasma applicator delivers an output power expressed in terms of wattage, as is known in the art. In an exemplary embodiment, the plasma applicator for the present development produces an output power from about 300 W to about 30 kW. A representative hydrocarbon burner is shown in FIG. 3A. The hydrocarbon burner 127 comprises a concentric tube 130 attached to a metal plate or flange 132, an inlet tube 134 for oxidative gas and an inlet tube 136 for hydrocarbon gas. When the hydrocarbon burner 127 is used as the flame source 27, the concentric tube 130 of the hydrocarbon burner 127 is positioned within the reactor body 20 and the inlet tubes 134, 136 are positioned outside the reactor body 20 to allow for the gas feeds. As shown in FIG. 3B, the burner 127 may be modified to have multiple flames. Some exemplary burners may have one flame or three flames or five flames. In a preferred embodiment, the hydrocarbon burner 127 may be operated in a sealed chamber or an opened chamber.

Figure 4:
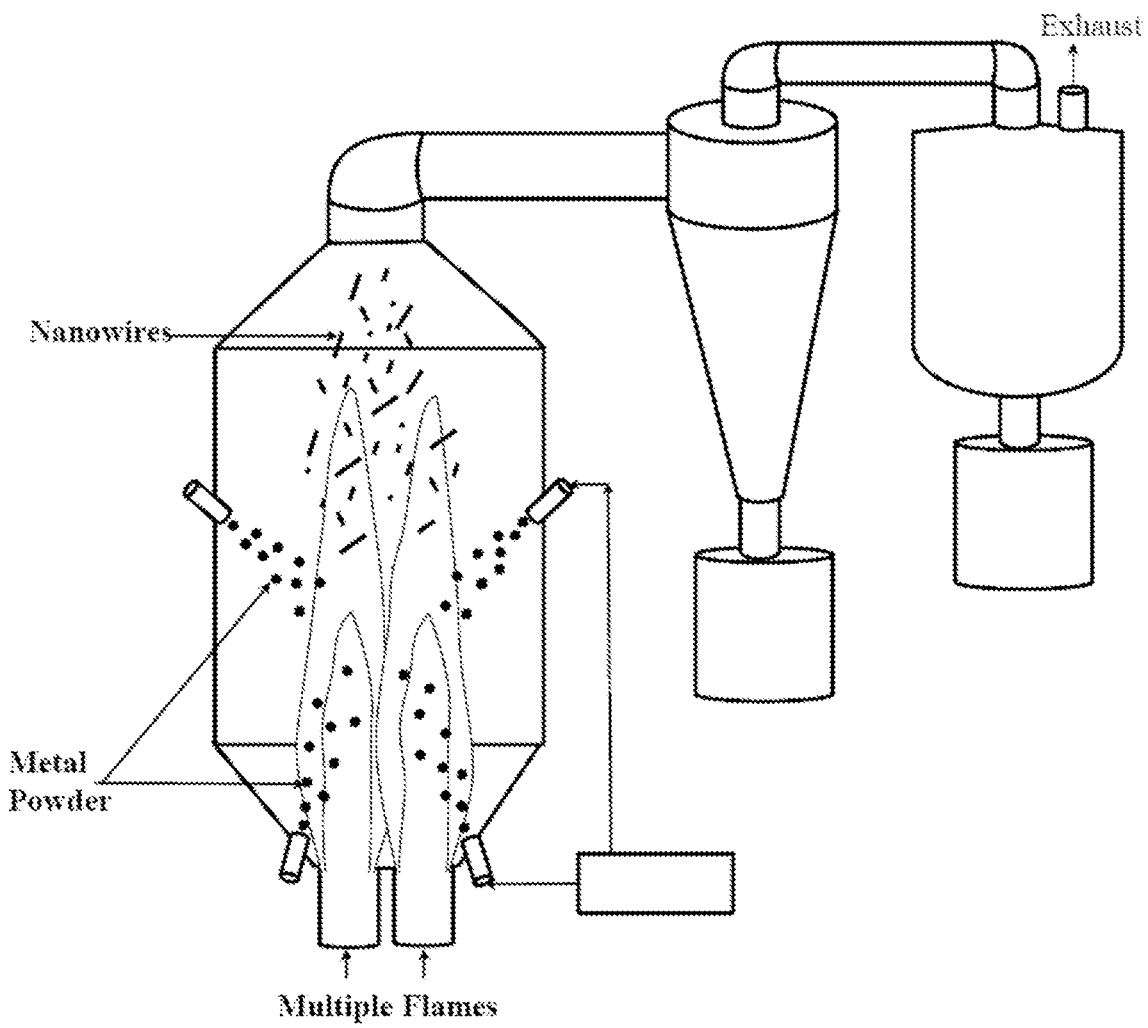
FIG. 4 is a schematic representation of a first alternative embodiment of a reactor system made in accordance with the invention.

The reactor can be operated with plasma flames, hydrocarbon based flames, or with a combination thereof. As shown in FIGS. 4 and 5, multiple hydrocarbon flames can be inserted into reactor body at the bottom for hydrocarbon based operation. When a combination of plasma flame and hydrocarbon flame is used, the plasma flame and the hydrocarbon flame should be added at different sites. For example, the plasma flame is introduced at the bottom of reactor body and the hydrocarbon flames are introduced at view ports 49 or the hydrocarbon flames are introduced at the bottom of the reactor body and the plasma flame is introduced at view ports 49. The use of hydrocarbon increases conversion of metal powder to nanomaterials. Representative hydrocarbons that may be used are natural gas (methane), propane, acetylene, pentane, or a combination thereof. In a preferred embodiment, the hydrocarbon is acetylene or propane or natural gas. Optionally, oxidative gases, such as oxygen, liquid oxygen, atmospheric air, compressed air or a combination thereof may also be injected into the reactor body.

The powder feeder 28 is designed to allow metal powder to be fed into the reactor body 20 through the inlet ports 48 or through the view ports 49 or through a combination thereof. Powder feeders are known in the art, and any powder feeder that can function to deliver powder into the reactor without obstructing the functionality of the reactor may be used. In a preferred embodiment, a screw based powder feeder or a gas flow based powder feeder is recommended. It is further recommended, but not required, that the powder feeder 28 be mounted close enough to the flame source 27 that the powder can be drawn into the flame by the vortex created by the flame while being far enough away from the flame source 27 to not affect the strength and quality of the flame. By allowing the powder to be drawn into the vortex, the effect of a fluidized bed is created wherein the metal powder is essentially fluidized. This results in a greater residence time for the metal powder in the flame, and therefore a greater probability that the metal powder will fully react to form nanostructures.

The cyclone 22 may be any cyclone separator that can separate the unreacted metal or other relatively large particles from the desired nanomaterials. As is known in the art, the cyclone separator utilizes a vortex separation process so material separation may be achieved without the use of filters, with heavier components being pulled by gravity toward the bottom of the cyclone and lighter materials. In the present invention, the cyclone 22 separates any unreacted metal or large particles are separated from the nanomaterial product, and the unreacted metal or large particles are directed to the cyclone material rework container 26A.

The dust removal unit 24 can be any dust removal system that can remove extra fine dust and unreacted materials from the desired nanomaterials. In a preferred embodiment, the dust removal unit 24 is a dual chamber baghouse filter design that uses a pressure shock or pulse jet. The dual chamber design allows a first chamber to continue with product collection while the pressure shock is applied to the second chamber, and then the chambers reverse with the first chamber receiving the pressure shock while the second chamber collects product. In a more preferred embodiment, the dust removal unit 24 comprises four filters enclosed in a stainless steel housing with a pressure-shock dust removal system. Alternatively, a mechanical motor system may be used for dust removal. The nanomaterial product isolated from the dust is directed to and collected in the product collection container 26B.

In a first exemplary embodiment, the fluidized bed reactor body 20 is made of stainless steel and has a reactor body 20 approximately 48 inches long with a diameter at its narrowest point of about 2 inches and a diameter at its widest point of about 10 inches. The reactor body 20 has a 10 inch flange 50A, 50B to connect the top unit 30 to the bottom unit 40, a 4 inch head flange 32 to connect the top unit 30 to the cyclone 22, a 2 inch base flange 46 to connect the bottom unit 40 to the flame source 27, one powder inlet 48 with a ⅜" diameter channel positioned approximately 6 inches above the base flange 46, one gas inlet 49 with a ⅜" diameter channel positioned approximately 12 inches above the base flange 46, and four view ports which each have a ⅜" diameter channel.

The reactor system 10 is used to produce nanomaterials. Generally, the process to produce nanomaterials comprises the steps of (1) providing a reactor system 10 having a reactor body 20 fitted with a flame source 27 that will produce a vertical upward-directed flame and a powder feed 28, a cyclone separator 22 fitted with a material rework container 26A, and a dust collector 24 fitted with a product collection container 26B; (2) delivering a flame in the body of the reactor body; (3) feeding metal powder into the reactor body, preferably through the inlet ports 48 and/or the view ports 49, and concurrently pumping air into the reactor body 20 through inlet ports 48, such that the metal powder and air are carried into the flame and are allowed to react in the flame producing nanomaterials; (4) allowing the metal powder to remain in the flame for a residence time of from about 0.1 seconds to about 5 seconds; (5) forcing the nanomaterials and unreacted metal powder and metal byproducts into the cyclone 22; (6) removing the unreacted metal powder and heavy metal byproducts from the nanomaterials and unreacted metal powder dust and light metal byproducts using cyclonic separation and collecting the removed metal powder and heavy metal byproducts in a material rework container; (7) forcing the nanomaterials and unreacted light metal powder and metal byproducts into the dust separator 24; (8) removing the unreacted metal powder dust and light metal byproducts from the nanomaterials and collecting the nanomaterials in a product collection container 26B.

The flame source may be a plasma applicator or a hydrocarbon burner. In a preferred embodiment, the flame source is a plasma applicator.

The metal powder may be fed into the reactor body through the inlet ports 48 near the base of the reactor body or through view ports 49 located near the midsection or top of the reactor body. Feeding the metal powder from the top or midsection is beneficial when processing a large amount of powder because the metal powder falls down through the reactor and the flame from the gravitational pull but meets a counter-flow of air coming from the bottom of the reactor which results in the metal powder being fluidizing inside the reactor body.

For optimal operation, it is recommended, but not required that, the metal powder be fed to the reactor body at a rate of from about 5 grams per minute to about 25 grams per minute. The metal powder residence time in the flame may vary depending on the particular metal used, the flame source, the metal feed rate, and the desired product. The residence time range provided herein is for purposes of demonstrating the invention and is not intended to be otherwise limiting. In a preferred embodiment, the nanomaterials and unreacted metal powder and metal byproducts are transferred from the reactor body 20 into the cyclone 22 and from the cyclone 22 to the dust separator 24 in a continuous process, such as by using enclosed piping 23 to connect the reactor body to the cyclone and to connect the cyclone to the dust separator. However, it is expected that the process would produce the desired nanomaterials if the nanomaterials and unreacted metal powder and metal byproducts are collected from the reactor body and then fed into a cyclone and/or if the nanomaterials and light metal byproducts are collected from the cyclone and then fed into a dust separator, i.e. to produce the nanomaterials as taught herein it is not required that the process be a continuous process.

As is known in the art, the air flow rate will affect the flame characteristics. Specifically, a high flow rate of air through the inlet port 48 helps to expand the flame toward the flame's mid-section and upper section. The expansion of the flame provides better contact of metal particles with the flame which results in better conversion of metal powder to nanomaterials. As used herein, a "high flow rate" of air is equal to 20 LPM (standard liters per minute) or greater. In a preferred embodiment, the air flow rate is from 20 LPM to 200 LPM.

In a first exemplary embodiment, zinc metal powder is used to produce zinc oxide nanowires. The reactor body has a height of about 48 inches. The flame source is a plasma applicator with a 3 kW plasma flame. Air is pumped into the reactor body at an air flow rate of about 60 LPM. Zinc metal powder is fed into the reactor body at a rate of from about 5 grams per minute to about 25 grams per minute. With a 3 kW plasma flame, an air flow of 60 LPM is estimated using entraining velocities to support complete oxidation of at least 50 gram/min of micron size zinc metal powder from the bottom using a powder feeder, and the particles will be fluidizing in the air while in contact with the flame in the reactor chamber. This will allow the residence time to be from about 0.5 seconds to about 5 seconds to produce zinc oxide nanowires/nanorods of about 5 microns in length and about 20 nm to about 100 nm in diameter. This residence time has been observed to result in essentially complete conversion of metal particles to nanomaterials.

In a second exemplary embodiment, the reactor body is expanded in size to accommodate multiple flames. A screw powder feeder capable of feeding up to 1,000 grams per minute is used, and about 40% of the metal powder is fed into the reactor body through the inlet port 48 and about 60% of the metal powder is fed into the reactor body through at least one view port 49, preferably positioned near the midsection of the reactor body. With a continuous feed of metal powder, about 300 kg of nanomaterial is produced in a twenty-four hour period.

Figure 6:
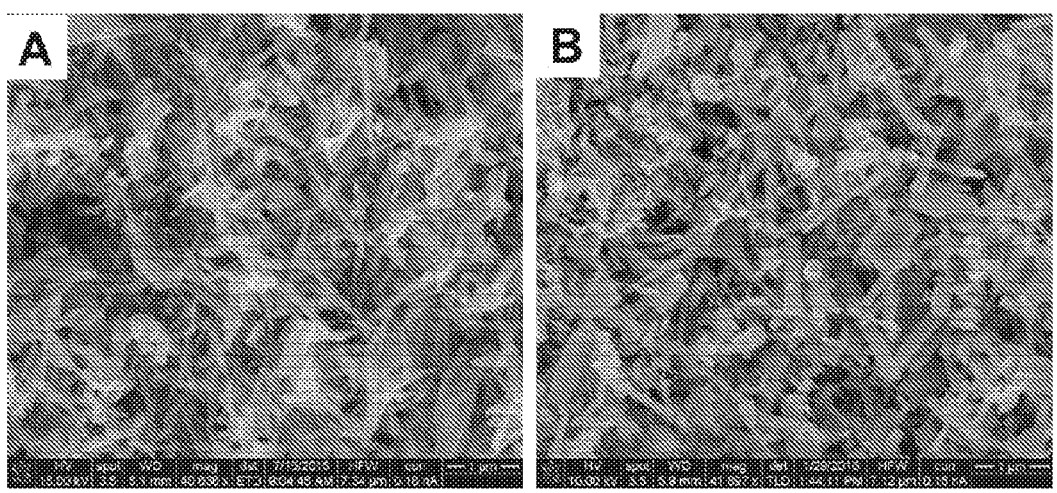
FIGS. 6A and 6B are scanning electron microscope images of zinc oxide nanowire produced from zinc metal powder using the reactor system of FIG. 1.

In a first example, not intended to be limiting with respect to scope of the development, a reactor system as described infra is used to produce zinc oxide nanowires. A plasma flame of about 1.5 kW to about 2.5 kW is ignited, zinc metal powder having about a 1 micron to 5 micron particle size (available from Atlantic Equipment Engineers, Inc., Catalog No. ZN-101) is fed into the reactor at a feed rate of about 5 grams per minute to about 25 grams per minute with a total air flow rate of about 50 LPM to about 100 LPM. The zinc oxide nanowire powder that is produced is collected at the cyclone and at the filter housing. The zinc oxide nanowire production rate is about 10 kilograms per day. An SEM image of the zinc oxide nanowires produced are shown in FIG. 6A.

In a second example, the nanowire production of the first example is repeated except tin metal powder having about a 1 micron to 5 micron particle size (available from Atlantic Equipment Engineers, Inc., Catalog No. SN-101) is substituted for the zinc metal powder. Acceptable tin oxide nanowires are produced at a production rate of 10 kilograms per day.

In a third example, the nanowire production of the first example is repeated except a hydrocarbon flame of about 2 LPM to about 10 LPM is substituted for the plasma flame. The zinc oxide nanowire production rate is about 25 kilograms per day. An SEM image of the zinc oxide nanowires produced are shown in FIG. 6B.

In a fourth example, the nanowire production of the first example is repeated except a mixture of tin oxide particles having about a 1 micron to 5 micron particle size (available from Atlantic Equipment Engineers, Inc., Catalog No. SN-601) and potassium hydroxide at weight ratio of 3 to 1 is substituted for the zinc metal powder. Potassium stannate nanowires are produced. The potassium stannate nanowires are then converted to tin oxide nanowires by an ion exchange with hydrochloric acid and annealing in plasma flame. Acceptable tin oxide nanowires are produced at a production rate of 10 kilograms per day.

In a fifth example, potassium stannate particles (available from Sigma Aldrich, Catalog No. 462799) are substituted for the mixture of tin oxide particles and potassium hydroxide for tin oxide nanowire production. Acceptable nanowires are produced at a production rate of 10 kilograms per day.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims.

The term "ambient temperature" as used herein refers to an environmental temperature of from about 0° F. to about 120° F., inclusive.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

All compositional percentages used herein are presented on a "by weight" basis, unless designated otherwise.

Specific dimensions relevant to the reactor system are provided herein for the purpose of demonstrating the invention, but these dimensions are not intended to limit the scope of the invention. It is understood that, in light of a reading of the foregoing description, one with ordinary skill in the art may make alterations and/or modifications to the present invention, and specifically to the embodiments shown and described herein, without departing from the scope of the invention. For example, those skilled in the art may substitute materials supplied by different manufacturers than specified herein without altering the scope of the present invention. It is anticipated that the reactor system of the present invention may be used in other material production applications, without departing from the scope of the invention.

What is claimed is:

1. In a reactor system for producing nanostructures wherein the reactor system comprises a reaction chamber having a flame source, and a powder feeder to disperse a material for producing nanostructures into the flame, and a separation means to receive and separate the produced nanostructures and unreacted dispersed material and to isolate the produced nanostructures, the improvement comprising: providing a reaction chamber that defines a bottom and a top and that has a flame source located at the bottom and wherein the top is adapted to allow materials from the reaction chamber to be transferred to the separation means, and wherein the reaction chamber is oriented such that a flame produced by the flame source projects upwardly into the reaction chamber, and wherein the flame is a combination of a plasma flame and a hydrocarbon flame, and wherein (a) the plasma flame is introduced at the bottom of the reactor body and the hydrocarbon flame is introduced through an inlet port positioned along the reactor body, or (b) the hydrocarbon flame is introduced at the bottom of the reactor body and the plasma flame is introduced through an inlet port positioned along the reactor body.

2. The reactor system of claim 1 wherein the flame source is a plasma applicator or a plasma torch or a hydrocarbon burner or a combination thereof.

3. The reactor system of claim 2 wherein the plasma applicator produces an output power from about 300 W to about 6 kW.

4. The reactor system of claim 1 wherein the reaction chamber further comprises at least one inlet port and the dispersed material is fed into the reaction chamber through an inlet port positioned near the source of the flame or through an inlet port positioned near a midsection of the reaction chamber or through a combination thereof.

5. The reactor system of claim 1 wherein the powder feeder is selected from a screw based powder feeder or a gas flow based powder feeder.

6. The reactor system of claim 1 further comprising a dust removal unit adapted to receive nanostructures and unreacted dispersed material from the separation means and to separate the nanostructures and unreacted dispersed material and to isolate the nanostructures in a container that is in communication with the dust removal unit.

7. The reactor system of claim 6 wherein the dust removal unit is a dual chamber baghouse filter design that uses a pressure shock or pulse jet.

8. In a reactor system for producing nanostructures wherein the reactor system comprises a reaction chamber having a flame source, and a powder feeder to disperse a material for producing nanostructures into the flame, and a mechanical separator to receive and separate the produced nanostructures and unreacted dispersed material and to isolate unreacted dispersed material in a container that is in communication with the separator, the improvement comprising: providing a reaction chamber that has a cone-shaped configuration with a narrow end of the cone formed adjacent to the flame source and a wide end of the cone closed with a cap adapted to allow materials from the reaction chamber to be transferred to the separator, and wherein the reaction chamber is oriented such that a flame produced by the flame source projects upwardly into the reaction chamber, and wherein the flame is a combination of plasma flame and hydrocarbon flame, and wherein (a) the plasma flame is introduced at the bottom of the reactor body and the hydrocarbon flame is introduced through an inlet port positioned along the reactor body, or (b) the hydrocarbon flame is introduced at the bottom of the reactor body and the plasma flame is introduced through an inlet port positioned along the reactor body.

9. The reactor system of claim 8 wherein the flame source is a plasma applicator or a plasma torch or a hydrocarbon burner or a combination thereof.

10. The reactor system of claim 9 wherein the plasma applicator produces an output power from about 300 W to about 6 kW.

11. The reactor system of claim 8 wherein the reaction chamber further comprises at least one inlet port and the dispersed material is fed into the reaction chamber through an inlet port positioned near the source of the flame or through an inlet port positioned near a midsection of the reaction chamber or through a combination thereof.

12. The reactor system of claim 8 wherein the powder feeder is selected from a screw based powder feeder or a gas flow based powder feeder.

13. The reactor system of claim 8 further comprising a dust removal unit adapted to receive nanostructures and unreacted dispersed material from the mechanical separator and to separate the nanostructures and unreacted dispersed material and to isolate the nanostructures in a container that is in communication with the dust removal unit.

14. The reactor system of claim 13 wherein the dust removal unit is a dual chamber baghouse filter design that uses a pressure shock or pulse jet.

\* \* \* \* \*